(12) United States Patent
Nagasaki et al.

(10) Patent No.: US 11,022,831 B2
(45) Date of Patent: Jun. 1, 2021

(54) DISPLAY APPARATUS (71) Applicant: KYOCERA Corporation, Kyoto (JP)

(72) Inventors: Kouichi Nagasaki, Yasu (JP); Fumiaki Nakao, Kawasaki (JP); Takeshi Shintani, Ritto (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/607,635

(22) PCT Filed: May 28, 2018

(86) PCT No.: PCT/JP2018/020421
§ 371 (c)(1),
(2) Date: Oct. 23, 2019

(87) PCT Pub. No.: WO2018/225569
PCT Pub. Date: Dec. 13, 2018

(65) Prior Publication Data
US 2020/0301186 A1 Sep. 24, 2020

(30) Foreign Application Priority Data
Jun. 9, 2017 (JP) .............................. JP2017-114751

(51) Int. Cl.
G02F 1/1333 (2006.01)
G06F 3/01 (2006.01)
G02F 1/13357 (2006.01)

(52) U.S. Cl.
CPC .... *G02F 1/13338* (2013.01); *G02F 1/133308* (2013.01); *G02F 1/133602* (2013.01); *G06F 3/016* (2013.01)

(58) Field of Classification Search
None
See application file for complete search history.

(56) References Cited

U.S. PATENT DOCUMENTS 9,152,233 B2 10/2015 Ikeda
9,864,474 B2 1/2018 Hayashi et al.
(Continued)

FOREIGN PATENT DOCUMENTS

JP H10-164193 A 6/1998
JP 2015-041289 A 3/2015
(Continued)

*Primary Examiner* — Ifedayo B Iluyomade
(74) *Attorney, Agent, or Firm* — Studebaker & Brackett PC (57) ABSTRACT Damage to a vibrator is reduced, and reliability of a display apparatus of a tactile sensation transmitting type is improved. The display apparatus includes: a display substrate having an operation surface; a support disposed away from the display substrate on an opposite side from the operation surface of the display substrate; a vibrator that is arranged between the display substrate and the support and configured to vibrate the display substrate; and an elastic support member that extends from a display substrate side surface of the support to a surface of the support on an opposite side from the display substrate in a manner wrapping around the support, and has one edge fixed to the surface of the support on the opposite side from the display substrate and the other edge elastically supporting the display substrate. The support includes a displacement restriction portion to which a portion of the elastic support member abuts, and which is configured to restrict displacement of the elastic support member in a direction perpendicular to the operation surface.

13 Claims, 8 Drawing Sheets (56) References Cited

U.S. PATENT DOCUMENTS

| | | | |
|---|---|---|---|
| 2013/0009893 A1* | 1/2013 | Okumura | G06F 3/041 |
| | | | 345/173 |
| 2013/0342484 A1 | 12/2013 | Bae et al. | |
| 2015/0054756 A1 | 2/2015 | Ikeda | |
| 2015/0256656 A1* | 9/2015 | Horii | H04M 1/03 |
| | | | 455/575.1 |
| 2016/0162080 A1* | 6/2016 | Hayashi | G06F 3/044 |
| | | | 345/173 |
| 2016/0170539 A1 | 6/2016 | Watanabe et al. | |
| 2018/0308325 A1 | 10/2018 | Takeda | |
| 2019/0025920 A1 | 1/2019 | Takeda | |

FOREIGN PATENT DOCUMENTS

| | | |
|---|---|---|
| JP | 2016-110380 A | 6/2016 |
| JP | 2017-091457 A | 5/2017 |
| JP | 2017-097784 A | 6/2017 |

* cited by examiner

DISPLAY APPARATUS

CROSS REFERENCE TO RELATED APPLICATION

This application claims priority to and the benefit of Japanese Patent Application No. 2017-114751 filed on Jun. 9, 2017, the entire contents of which are incorporated herein by reference.

TECHNICAL FIELD

The present disclosure relates to a display apparatus.

BACKGROUND

Recently, various consumer devices and various industrial appliances are increasingly equipped with display apparatuses configured to generate a sound by vibrating a display substrate or to present a tactile sensation generated by vibration to a user touching the display substrate. The consumer devices include mobile information devices such as smartphones and tablet PCs (Personal Computers), and household appliances such as microwave ovens, televisions, lighting equipment, and the like. The industrial appliances include ATMs (automated teller machines), automatic ticket vending machines, beverage vending machines, and the like.

For example, PTL 1 set forth below discloses a touch panel according to which a rectangular touch panel is supported by leaf springs at its four corners, and the touch panel is vibrated by a vibrator attached thereto, such that a tactile sensation generated by the vibration is presented to a user touching the touch panel.

CITATION LIST

Patent Literature

PTL 1: JP-A-2015-41289

SUMMARY

A display apparatus of a tactile sensation transmitting type (a tactile sensation transmitting type display apparatus) according to the present disclosure includes a display substrate, a support, a vibrator, and an elastic support member. The display substrate includes an operation surface. The support is disposed away from the display substrate on an opposite side from the operation surface of the display substrate. The vibrator is arranged between the display substrate and the support and configured to vibrate the display substrate. The elastic support member extends from a display substrate side surface of the support to a surface of the support on an opposite side from the display substrate in a manner wrapping around the support. The elastic support member has one edge fixed to the surface of the support on the opposite side from the display substrate. The elastic support member has the other edge that elastically supports the display substrate. The support includes a displacement restriction portion to which a portion of the elastic support member abuts, and which is configured to restrict displacement of the elastic support member in a direction perpendicular to the operation surface.

A display apparatus according to the present disclosure includes a display substrate, a support, a vibrator, and an elastic support member. The display substrate includes a display surface. The support is arranged spaced apart from the display substrate on an opposite side from the display surface of the display substrate. The vibrator is arranged between the display substrate and the support and configured to output a sound by vibrating the display substrate. The elastic support member extends from a display substrate side surface of the support to a surface of the support on an opposite side from the display substrate in a manner wrapping around the support. The elastic support member has one edge that is fixed to the surface of the support on the opposite side from the display substrate. The elastic support member has the other edge that elastically supports the display substrate. The support includes a displacement restriction portion to which a portion of the elastic support member abuts, and which is configured to restrict displacement of the elastic support member in a direction perpendicular to the operation surface.

A display apparatus according to the present disclosure includes a display substrate, a support, a vibrator, and an elastic support member. The display substrate includes a display surface. The support is arranged spaced apart from the display substrate on an opposite side from the display surface of the display substrate. The vibrator is arranged between the display substrate and the support and configured to output a sound by vibrating the display substrate. The elastic support member is extending so as to surround the support. The elastic support member has one edge that is fixed to the surface of the support on the opposite side from the display substrate. The elastic support member has the other edge that elastically supports the display substrate. The support constitutes a display apparatus that includes a displacement restriction portion to which a portion of the elastic support member abuts, and which is configured to restrict displacement of the elastic support member in a direction perpendicular to the operation surface. The display apparatus is installed in a vehicle cabin space.

DETAILED DESCRIPTION

In a conventional display apparatus, a display substrate is elastically supported in a manner which enables vibration upon excitation by a vibration element. Thus, when a large acceleration is externally applied to the display apparatus and the display substrate is excessively displaced, the vibration element receives a large force from the display substrate and may be damaged.

Figure 1:
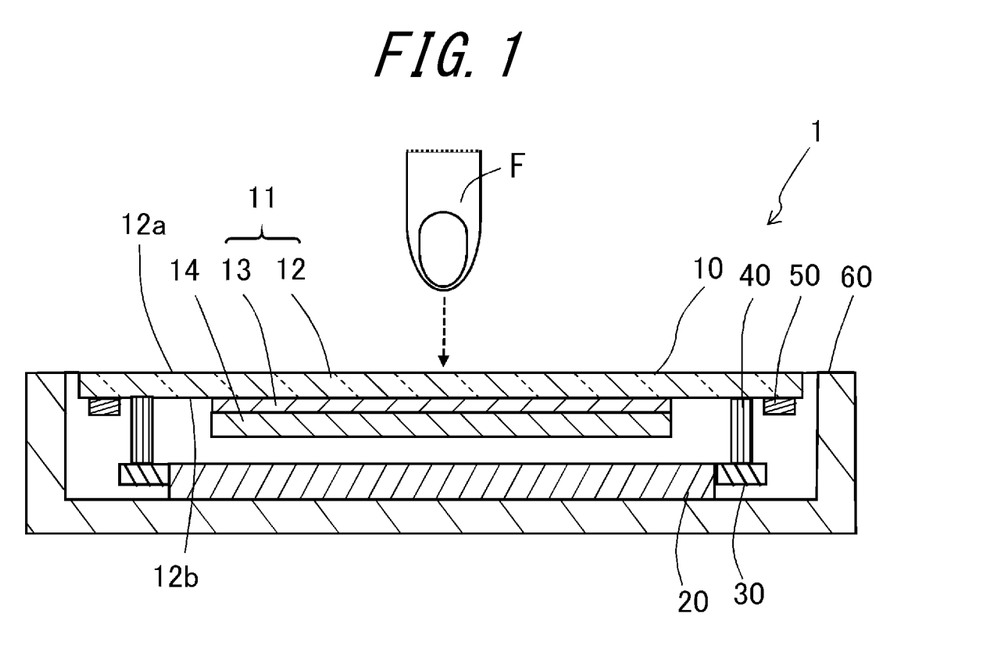
FIG. 1 is a cross-sectional view schematically illustrating a display apparatus of a tactile sensation transmitting type according to an exemplary embodiment.

FIG. 1 is a cross-sectional view schematically illustrating a display apparatus according to an exemplary embodiment. According to the present embodiment, the display apparatus is of a tactile sensation transmitting type. The shape of each of the constituent elements and manner of connection therebetween illustrated in FIG. 1 are merely schematic, and details thereof will be illustrated in FIG. 2 and subsequent figures. A liquid crystal display apparatus 1 serving as the display apparatus includes a liquid crystal display panel 14 serving as a display panel arranged on a rear surface of a transparent touch panel 11. The liquid crystal display apparatus 1 further includes a backlight 20 arranged on a rear surface of the liquid crystal display panel 14. The liquid crystal display apparatus 1 has a configuration in which the touch panel 11, the liquid crystal display panel 14, and the backlight 20 are enclosed in a housing 60.

The touch panel 11 includes, for example, a contact detection unit 13 that is formed as a thin film and arranged on a rear surface 12b on a side opposite from an operation surface 12a of a transparent protective plate 12. The liquid crystal display panel 14 is configured to display graphic information and arranged on the contact detection unit 13. The touch panel 11 and the liquid crystal display panel 14 are superimposed and integrated to constitute a display substrate 10. Note that the display substrate 10 simply needs to include the operation surface 12a and a display function and does not necessarily need to be configured as a combination of the touch panel 11 and the liquid crystal display panel 14. Thus, the display substrate 10 may consist of the operation surface 12a and at least one of the transparent protective plate 12, the contact detection unit 13, and the liquid crystal display panel 14 that has a display function. For example, when the liquid crystal display panel 14 includes the operation surface 12a, the display substrate 10 consists of the liquid crystal display panel 14. Further, a protective member such as a glass cover may be provided on the exterior of the touch panel 11 and elastically supported by elastic support members 40.

The transparent protective plate 12 can be formed from a glass plate, a plastic plate, or the like. The operation surface 12a of the transparent protective plate 12 can be operated by a user touching the operation surface 12a with a finger F or a stylus pen. The contact detection unit 13 can detect a position of the finger F or the stylus pen touching the operation surface 12a. A detection method may be a capacitive type, a resistive type, or the like.

The contact detection unit 13 may be incorporated in, or separate from, the liquid crystal display panel 14. An organic EL (Electroluminescence) display panel, an LED (Light Emitting Diode) display panel, or the like may be used in place of the liquid crystal display panel 14.

The backlight 20 is arranged spaced apart from the display substrate 10 on a side opposite from the operation surface 12a of the display substrate 10. When a self-luminous panel such as an organic EL display panel or an LED display panel is used as the display substrate 10 in place of the liquid crystal display panel 14, the backlight 20 can be omitted.

The display substrate 10 is elastically supported by the elastic support members 40 arranged at respective edges of the display substrate 10. Each of the elastic support members 40 has one edge fixed to a support 30 and the other edge elastically supporting the display substrate 10. Supports 30 are arranged spaced apart from the display substrate 10 on the side opposite from the operation surface 12a of the display substrate 10 and fixed to the backlight 20. The supports 30 may be integrally formed with the backlight 20. When a self-luminous display panel is used, such as an organic EL display panel or an LED display panel for which a backlight is not necessary, the supports 30 may be fixed to the housing 60. Further, the supports 30 may be integrally formed with the housing 60, i.e., may constitute respective portions of the housing 60.

Vibration members 50 are arranged on the rear surface 12b of the transparent protective plate 12. Each of the vibration members 50 includes a vibrator 56, is fixed to or in contact with the display substrate 10, and is able to vibrate the display substrate 10 at a frequency of approximately 20 Hz to 20,000 Hz. To present a tactile sensation, the display substrate 10 is appropriately vibrated at a frequency of approximately 50 Hz to 200 Hz. The user may perceive vibration of the display substrate 10 as a tactile sensation by touching the operation surface 12a with a finger F or the stylus pen. Each of the vibration members 50 may have a configuration in which the vibrator 56, such as a piezoelectric element, is attached to the transparent protective plate 12 to transmit vibration directly thereto. As described later, a vibrator support member 51 of the vibration member 50 may support the vibrator 56, and the vibrator support member 51 may contact the transparent protective plate 12 to vibrate the display substrate 10. Also, a configuration in which the vibrator 56, configured as the piezoelectric element or the like, has a sensor function for detecting distortion of a vibrating plane caused by a contact by the finger F or the stylus pen, thereby functioning as the contact detection unit 13, is possible.

Figure 2:
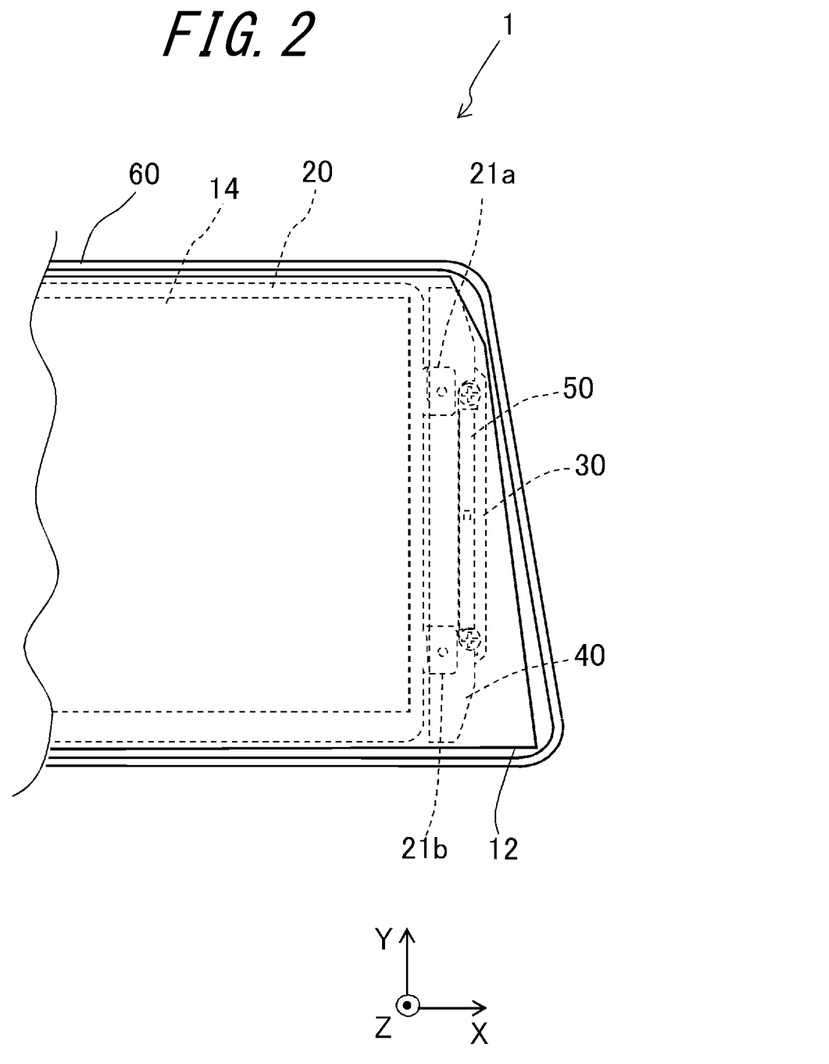
FIG. 2 is a partial plan view illustrating the display apparatus according to the exemplary embodiment.

FIG. 2 is a partial plan view of the display apparatus according to the example of the embodiment and illustrates a right-side portion of the display apparatus in a plan view. The left-side portion of the display apparatus has a similar configuration. When the liquid crystal display apparatus 1 is implemented, an exterior panel may be further provided on the periphery of the transparent protective plate 12. The liquid crystal display panel 14, the backlight 20, the supports 30, the elastic support members 40, and the vibration members 50 are enclosed in the housing 60 on the side opposite from the operation surface 12a of the transparent protective plate 12.

Connection portions 21a and 21b for fixing the supports 30 are provided protruding from the respective sides of the backlight 20. The support 30 is provided on the side of the backlight 20 and fixed to the connection portions 21a and 21b by screws. The elastic support member 40 and the vibration member 50 are attached to the support 30. By virtue of a configuration in which the support 30 is attached to the backlight 20, it is possible to configure the display apparatus as a combination of various types of backlight 20 and a single type of support 30, thereby enabling sharing of constituent elements.

backlight 20 Integration such that the backlight 20 has the function of the supports 30 is also possible. This reduces the number of constituent elements and thus can reduce assembly steps and cost. In the following description, the transverse direction of the support 30 illustrated in FIG. 2 is defined as an X direction, the longitudinal direction of the support 30 is defined as a Y direction, and a direction perpendicular to the operation surface 12a is defined as a Z direction.

Figure 3:
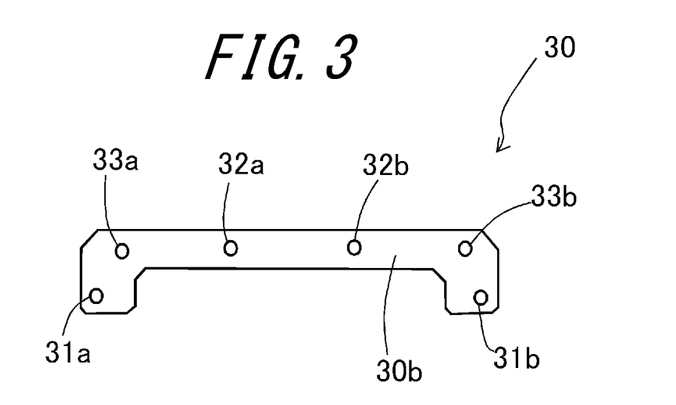
FIG. 3 is a bottom view illustrating a support of the display apparatus according to the exemplary embodiment.
Figure 4:
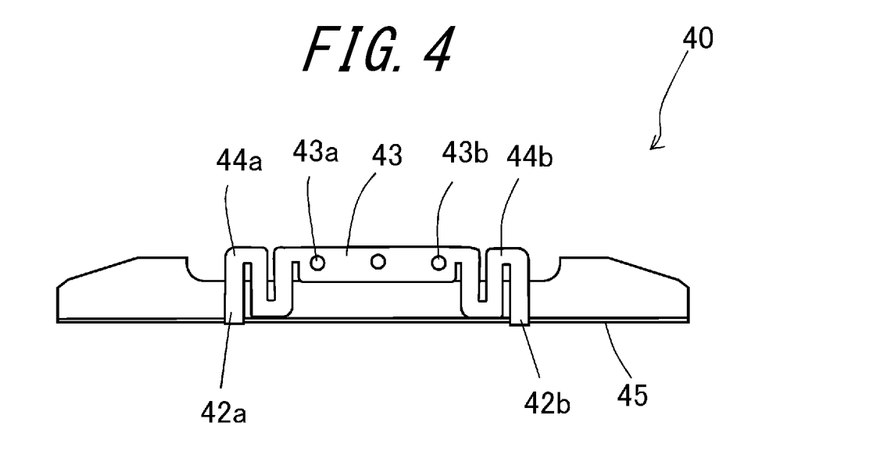
FIG. 4 is a bottom view illustrating an elastic support member of the display apparatus according to the exemplary embodiment.
Figure 5:
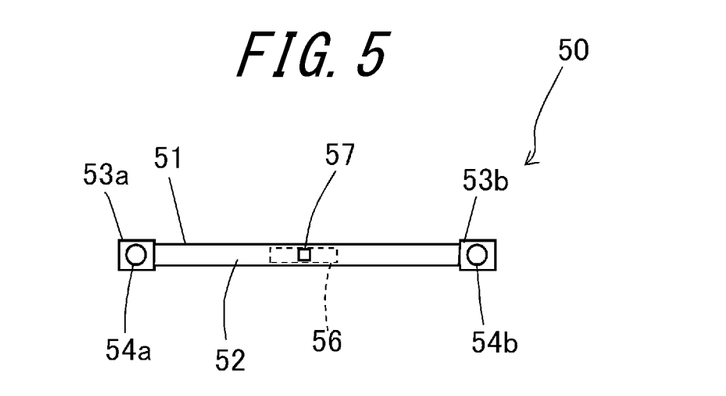
FIG. 5 is a plan view illustrating a vibration member of the display apparatus according to the exemplary embodiment.
Figure 6:
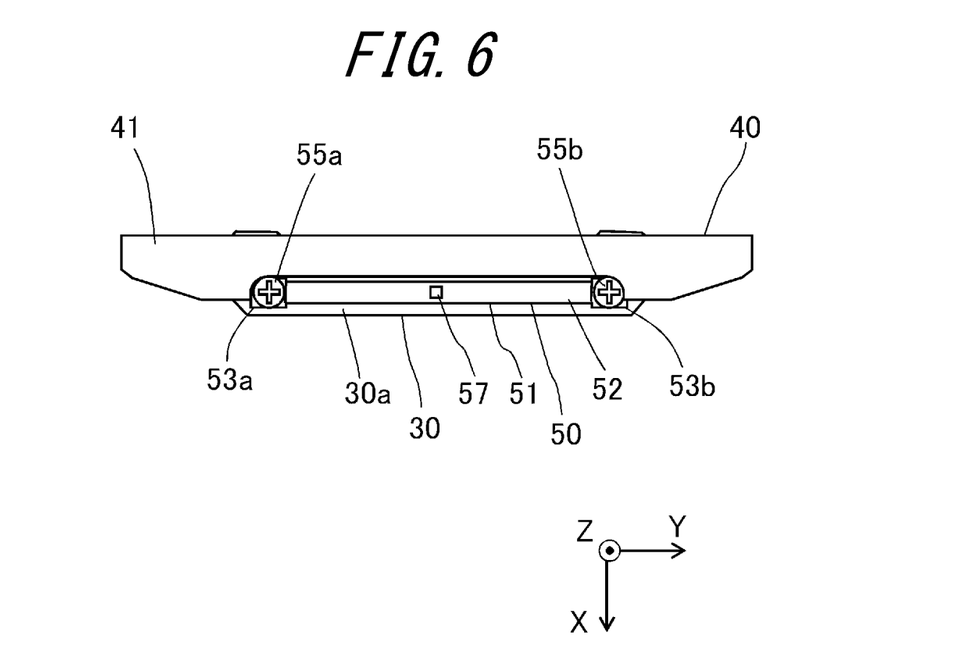
FIG. 6 is a plan view illustrating the support, the elastic support member, and the vibration member of the display apparatus according to the exemplary embodiment.
Figure 7:
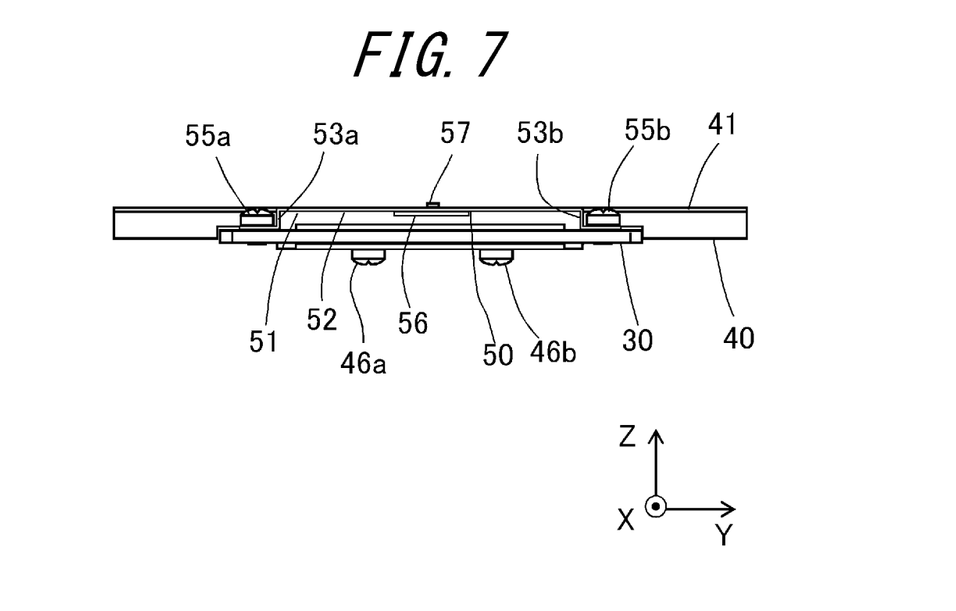
FIG. 7 is a side view illustrating the support, the elastic support member, and the vibration member of the display apparatus according to the exemplary embodiment.
Figure 8:
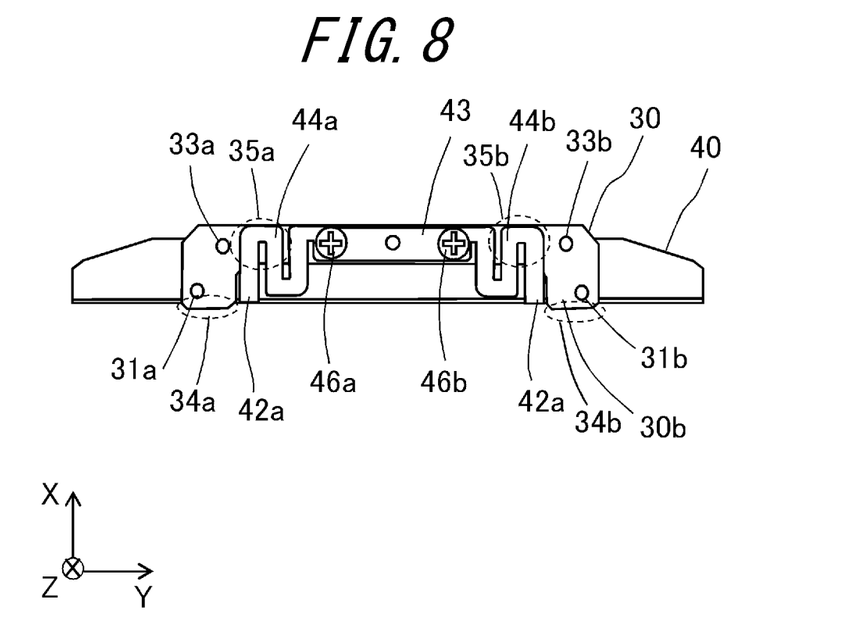
FIG. 8 is a bottom view illustrating the support, the elastic support member, and the vibration member of the display apparatus according to the exemplary embodiment.
Figure 9:
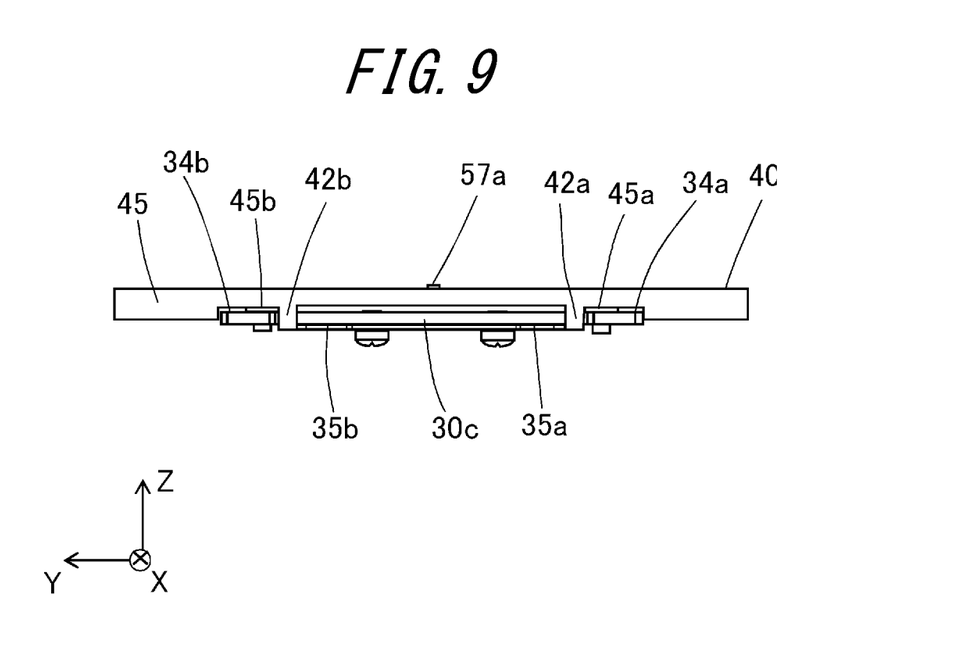
FIG. 9 is a side view illustrating the support, the elastic support member, and the vibration member of the display apparatus according to the exemplary embodiment.
Figure 10A:
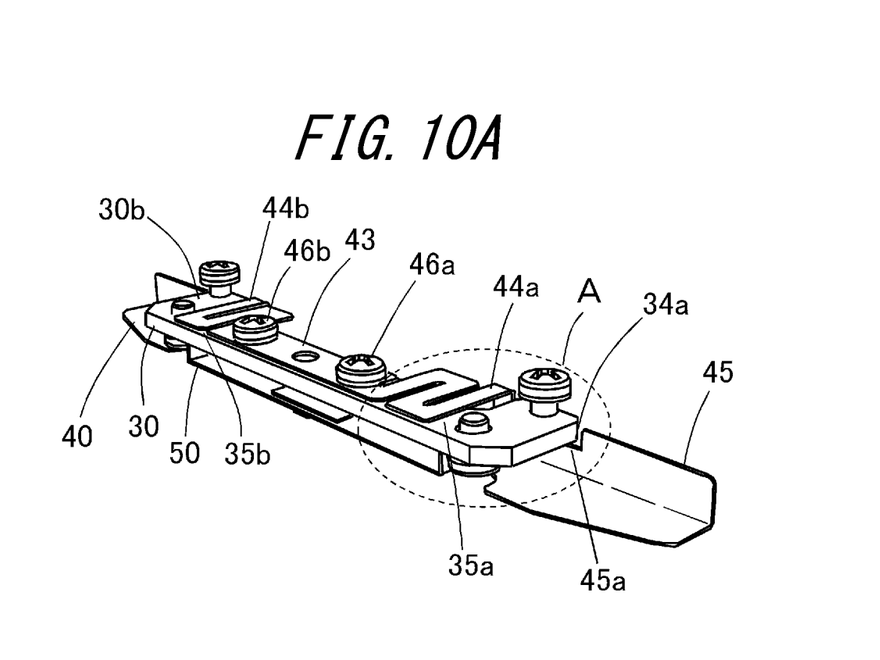
FIG. 10A is an overall perspective view illustrating the support, the elastic support member, and the vibration member of the display apparatus according to the exemplary embodiment.
Figure 10B:
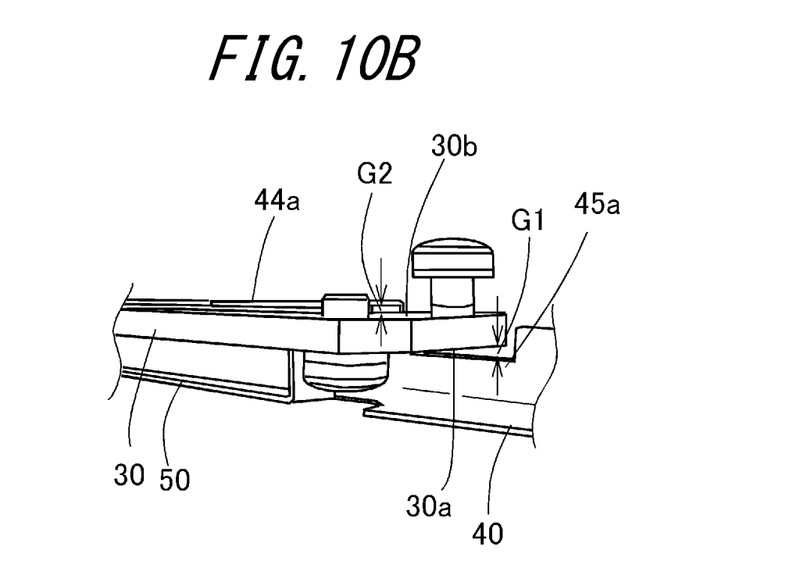
FIG. 10B is a partially enlarged view of a portion A indicated by a dotted line in FIG. 10A.

FIG. 3 is a bottom view of the support of the display apparatus according to the example of the present embodiment. FIG. 4 is a bottom view of the elastic support member of the display apparatus according to the example of the present embodiment. FIG. 5 is a plan view of the vibration member of the display apparatus according to the example of the present embodiment. FIG. 6 to FIG. 9 are diagrams illustrating the support, the elastic member, and the vibration member of the display apparatus according to the example of the present embodiment. FIG. 6 is a bottom view, FIG. 8 is a plan view, and FIG. 7 and FIG. 9 are side views. FIG. 10A is an overall perspective view illustrating the support, the elastic support member, and the vibration member of the display apparatus according to the example of the present embodiment. FIG. 10B is a partially enlarged view of a portion A indicated by a dotted line in FIG. 10A.

The support 30 may be formed from, for example, a stainless steel plate (SUS304) having a thickness of approximately 2 mm. The longitudinal length of the support 30 is approximately 50 mm to 200 mm, and the transverse length of the support 30 is approximately 10 mm to 30 mm. A metal such as aluminum or resin may be used in place of the stainless steel plate described above as the material for the support 30. The support 30 includes a surface 30a on the side of the display substrate 10 and a rear surface 30b on a side opposite from the display substrate 10. The support 30 includes screw holes 31a, 31b, 32a, 32b, 33a, and 33b formed as through-holes. The screw holes 31a and 31b are screw holes for connecting the supports 30 to the backlight 20, the screw holes 32a and 32b are screw holes for securing the corresponding elastic support member 40, and screw holes 33a and 33b are screw holes for securing the corresponding vibration member 50.

The elastic support member 40 may be formed from, for example, a stainless steel plate (SUS304) having an thickness of approximately 0.3 mm. The thickness of the elastic support members 40 can be appropriately determined in accordance with a force received from the display substrate 10 to be supported and desired spring characteristics. As illustrated in the bottom view of FIG. 4, edges of the elastic support members 40 include strip-like portions 42a and 42b edge, which are bent into a U-shape and an S-shape in a plan view to constitute spring portions 44a and 44b, respectively. The spring portions 44a and 44b of the elastic support member 40 are deformed primarily by displacement of the display substrate 10 in its thickness direction (i.e., in the Z direction) and function as leaf springs (torsion bars) for elastically supporting the display substrate 10. The elastic support member 40 has a longitudinal length of approximately 50 mm to 250 mm, a transverse length of approximately 10 mm to 30 mm, and a height-direction length of approximately 5 mm to 20 mm.

The elastic support member 40 includes a top surface 41 having a flat shape that is arranged on the side of the surface 30a of the support 30 and opposes the display substrate 10. The top surface 41 and the rear surface 12b of the transparent protective plate 12 are adhered to each other using double-sided tape or the like. The rear surface 12b of the transparent protective plate 12 is connected to the top surface 41.

The elastic support member 40 also includes strip-like portions 42a and 42b that extend from the top surface 41 and are bent to the rear surface 30b along the side surface 30c of the corresponding support 30. The strip-like portions 42a and 42b extend to wrap around the side surface 30c of the corresponding support 30 and are connected to the fixing portion 43 of the corresponding elastic support member 40 supported by the corresponding support 30 at distal ends thereof. Through holes 43a and 43b are formed on the fixing portion 43 and allow insertion of screws 46a and 46b thereinto such that the corresponding elastic support member 40 is fixed to the rear surface 30b of the support 30. The strip-like portions 42a and 53b are spaced apart from the rear surface 30b by approximately 0.5 mm and are arranged to be displaceable in the Z direction by virtue of a configuration in which a step is provided to a portion of each of the supports 30 for attaching the fixing portion 43 or a configuration in which the elastic support members 40 are attached via a spacer. The strip-like portions 42a and 42b have a width of approximately 2 mm to 10 mm, and are formed to be narrower than the top surface 41 and the fixing portion 43.

As illustrated in FIG. 4, the strip-like portions 42a and 42b include spring portions 44a and 44b that extend and bend in the Y direction on a side of the rear surface 30b and are fixed to the fixing portion 43. The spring portions 44a and 44b may have curved shapes in a plan view such as an S-shape, a V-shape, or a U-shape, or linear shapes. The spring effect of the spring portions 44a and 44b is expressed as a torsional action around the Y axis. Thus, even if the display substrate 10 is displaced in the Z direction or in the X direction, a force acts to restore the display substrate 10 to its original position. Thus, the display substrate 10 can be elastically supported.

Because the spring portions 44a and 44b are formed to have a curved shape such as an S-shape, V-shape, or U-shape, the spring portions 44a and 44b apply a restoring force to return the display substrate 10 being displaced in the Y direction to its original position. The Y direction corresponds to the longitudinal direction of the support 30. The display substrate 10 can be elastically supported in response to vibration in the Y axis direction.

Because the supports 30 and the elastic support members 40 are provided so as to oppose to each other, along opposing sides of the display substrate 10, the display substrate 10 can be supported in a stable manner by the elastic support members 40 arranged on either side of the display substrate 10.

As described above, each of the elastic support members 40 has a U-shaped cross-section and extends from the side of the support 30 facing the display substrate 10 to the side opposite from the display substrate 10, in a manner wrapping around the corresponding support 30 in the U-shape. Each of the elastic support member 40 has one edge fixed to the rear surface 30b of the corresponding support 30 on the side opposite from the display substrate 10 and the other edge elastically supporting the display substrate 10.

Because the spring portions 44a and 44b are formed to have a bent shape, the display substrate 10 can be elastically supported with respect to vibration in any direction. Thus, adverse effects on the display substrate 10 due to vibration can be reduced. Accordingly, reliability can be improved in applications such as in-vehicle equipment that needs vibration resistance.

The vibrator support member 51 is arranged on the support 30 on the other side of the operation surface 12a of the display substrate 10. The vibrator support member 51 may be formed from, for example, a stainless steel plate (SUS304) having a thickness of approximately 0.3 mm. The vibrator support member 51 includes a beam portion 52 that extends in a direction along the operation surface 12a of the display substrate 10. The length of the beam portion 52 is, for example, approximately 40 mm to 100 mm. Both edges of the beam portion 52 are bent toward the support 30 forming legs 53a and 53b. At the respective edges of the legs 53a and 53b, through holes 54a and 54b are formed to allow insertion and fitting of the screws 55a and 55b into the screw holes 33a and 33b of the respective supports 30. The beam portion 52 extends parallel to one side of the substrate 10, e.g., the transverse side or the longitudinal side of the display substrate 10 having a rectangular shape. The display substrate 10 is not limited to a rectangular shape and may have various shapes such as a triangular shape, a trapezoidal shape, a circular shape, an elliptical shape, a pentagonal or polygonal shape, an approximate rectangular shape or an approximate trapezoidal shape with curved corners, or the like.

The vibrator 56 is attached to the surface of the beam portion 52 on a side opposite from the display substrate 10. The vibrator 56 may be configured as a piezoelectric body such as a ceramic piezoelectric body or a polymer piezoelectric body. The material of the ceramic piezoelectric body may be barium titanate ($BaTiO_3$), lead titanate ($PbTiO_3$), lead zirconate titanate (Pb [$Zr_xTi_{1-x}$]$O_3$, 0<x<1, mixed crystal: PZT), potassium niobate ($KNbO_3$), lithium niobate ($LiNbO_3$), lithium tantalate ($LiTaO_3$), sodium tungstate ($Na_xWO_3$), zinc oxide (ZnO, $Zn_2O_3$), $Ba_2NaNb_5O_5$, $Pb_2KNb_5O_{15}$, lithium tetraborate ($Li_2B_4O_7$), sodium potassium niobate ((K, Na) $NbO_3$), bismuth sodium titanate ($Na_{0.5}Bi_{0.5}TiO_3$), or the like. The material of the polymeric piezoelectric member may be polyvinylidene fluoride (1,1-2 fluoride ethane polymer: PVDF) or the like.

The vibrator 56 is formed from, for example, a rectangular plate and attached to the central portion of the beam portion 52 facing the corresponding support 30. To the vibrator 56, a flexible print cable (not illustrated) or the like is connected and can vibrate the vibrator 56 by applying a voltage thereto. When the vibrator 56 vibrates, the beam portion 52 also vibrates. A protrusion 57 is formed at the center of the surface of the beam portion 52 on the side of the display substrate 10. The protrusion 57 is in contact with the transparent protective plate 12 of the display substrate 10 and transmits vibration of the vibrator 56 to the display substrate 10.

The protrusion 57 abuts the rear surface 12b of the display substrate 10 on the side opposite from the operation surface 12a of the transparent protective plate 12. The abutting portion of the protrusion 57 may be fixed to the rear surface 12b. The protrusion 57 is spring-biased towards and in contact with the transparent protective plate 12 by virtue of the elasticity of the beam portion 52 which is in a state slightly bent toward the corresponding support 30. Because the display substrate 10 is vibrated by the vibration member 50 in which the vibrator 56 is provided to the vibrator support member 51 as described above, the likelihood of damaging the vibrator 56 can be reduced as compared to a case in which the vibrator 56 is directly adhered to the display substrate 10. Further, because the vibrator support member 51 itself is elastically deformable, the vibrator support member 51 can absorb vibration from the outside and protect the vibrator 56 in applications such as in-vehicle equipment that are subjected to frequent vibration. Thus, the reliability of the display apparatus can be improved.

In a state in which an external force is not applied to the display substrate 10, concave portions 45a and 45b of the elastic support member 40 have a gap G1 from the surface 30a. For example, when the user presses the operation surface 12a with a finger F or a stylus pen, the display substrate 10 is pushed toward the support 30 together with the elastic support member 40. When the user applies too much pressure, the display substrate 10 is largely displaced and may apply a large force to the vibration member 50. Also, when a large acceleration is applied to the liquid crystal display apparatus 1, a large force may be applied to the vibration member 50. At this time, the elastic support member 40 supporting the display substrate 10 is also largely displaced, and the recess 45a and 45b provided in the bent portion 45 of the elastic support member 40 abut first displacement restriction portions 34a and 34b of the support 30 that protrude outward from the inner side of each of the elastic support members 40 in a plan view. This configuration restricts displacement of the display substrate 10 and the vibrator support member 51. Thus, the likelihood of damaging the vibrator 56 of the vibration member 50 can be reduced. When the vibrator 56 is attached to the vibrator support member 51, excessive deformation of the beam portion 52 can be suppressed, and the vibrator 56 can be protected.

Further, in a state in which an external force is not applied to the display substrate 10, a portion of each of the elastic support member 40 opposing the rear surface 30b of the corresponding support 30 except for the fixing portion 43 is spaced apart from the rear surface 30b by a gap G2. When a user operation or acceleration that can cause a large displacement of the display substrate 10 in a direction moving away from the support 30, spring portions 44a and 44b of the strip-like portions 42a and 42b partially abut the second displacement restriction portions 35a and 35b and can restrict excessive displacement of the display substrate 10. In this way, the first displacement restriction portions 34a and 34b and the second displacement restriction portions 35a and 35b are provided to restrict displacement of the display substrate 10 and the elastic support members 40. Accordingly, even when the display apparatus is used in an applications that are subjected to frequent vibration such as display apparatus of in-vehicle equipment, excessive displacement of the display substrate 10 and the elastic support member 40 caused by vibration can be suppressed. Thus, the reliability of the display apparatus can be improved.

The positions of the first displacement restriction portions 34a and 34b and the second displacement restriction portions 35a and 35b serving as the displacement restriction portions can be varied as appropriate in accordance with the shape of the supports 30 and the elastic support members 40. The displacement restriction portions are not limited to the springs 44a and 44b. For example, overhanging portions that branch and overhang from portions of the strip-like portion 42a and 42b in a direction parallel to the rear surface 30b of each of the supports 30 may be formed, and a portion of each of the supports 30 that abuts the overhanging portion when the elastic support members 40 are displaced may serve as the displacement restriction portion.

Figure 11:
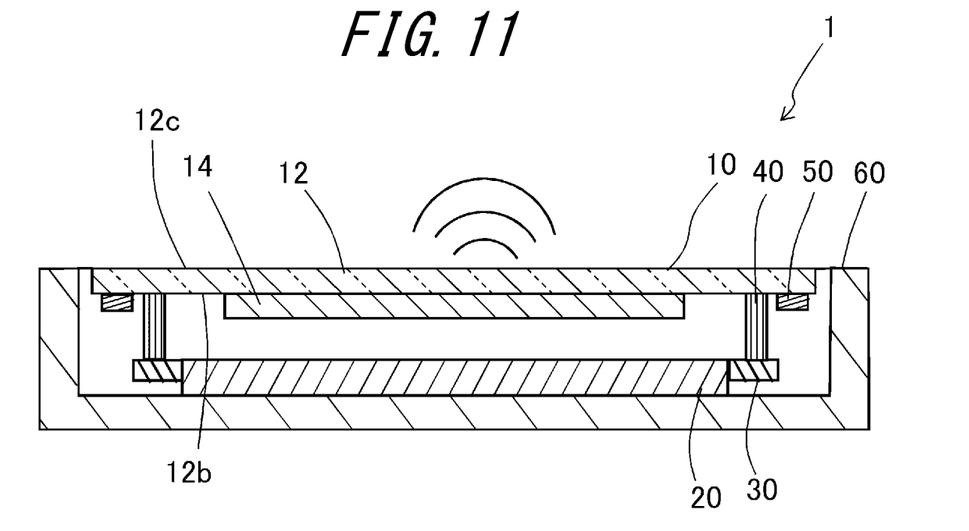
FIG. 11 is a cross-sectional view schematically illustrating a display apparatus according to another exemplary embodiment.

FIG. 11 is a schematic cross-sectional view illustrating a display apparatus of another embodiment. This embodiment relates to a display apparatus that has a speaker function. Unlike the display apparatus according to the previous embodiment, the contact detection unit 13 is not provided to the display substrate 10, and this display apparatus generates sound by vibrating the display substrate 10. In the liquid crystal display apparatus 1, a so-called flat speaker can generate sound by vibrating the vibrators 56 of the vibration members 50 at an audible frequency of approximately 20 Hz to 20,000 Hz and thus vibrating the display substrate 10 having a display surface 12c. When the display substrate 10 functions as a tweeter (a high-range speaker) of an audio system, the vibrators 56 of the vibration members 50 are vibrated preferably at a frequency of approximately 1,000 Hz to 20,000 Hz. In this case, in combination with a squawker (a midrange speaker) or a woofer (a low-range speaker), a two-way sound system, a three-way sound system, or the like may be configured. Such a sound system using the flat speaker of the present embodiment may be installed in, for example, a vehicle such as an automobile or the cabin space of the vehicle.

In cases where sound is generated by vibrating the display substrate 10, the thickness of the display substrate 10 is approximately 1.5 mm to 3 mm. Other than generating sound by vibrating the display substrate 10, the display apparatus of the present embodiment has the same configuration as that of the display apparatus of the previous embodiment. Thus, detailed descriptions thereof will be omitted. The display substrate 10 of the display apparatus having a flat speaker function simply needs to have a display function, and does not need to be configured as a combination of the transparent protective plate 12 and the liquid crystal display panel 14. Thus, the display substrate 10 may be configured by using at least one of the transparent protective plate 12 and the liquid crystal display panel 14 that have a display function. Also, the display substrate 10 may include the contact detection unit 13 illustrated in FIG. 1. Further, the exterior of the transparent protective plate 12 may be covered with a protective member such as a cover glass that is elastically supported by the elastic support members 40.

Further, in the display apparatus illustrated in FIG. 1, by vibration of the vibrators 56 of the vibration members 50 at a frequency in the audible frequency range, the display substrate 10 can be vibrated to generate a sound. In this case, when the vibration members 50 vibrate at a frequency of approximately 20 Hz to 20,000 Hz, a sound is generated. Also, when the vibration member 50 vibrates at a frequency of approximately 50 Hz to 200 Hz, a tactile sensation is presented to the user. The display substrate 10 having an thickness of approximately 1.5 mm to 3 mm can be used for the dual purpose for sound generation and tactile sensation presentation.

In the display apparatuses illustrated in FIG. 1 and FIG. 10, in cases where sound is generated by the vibration members 50, a configuration in which the protrusions 57 of the vibration members 50 illustrated in FIG. 5 abut the display substrate 10 to intensely transmit vibration is preferable. This configuration can efficiently vibrate the display substrate 10 and thus can generate music or voice sound with clarity.

Figure 12:
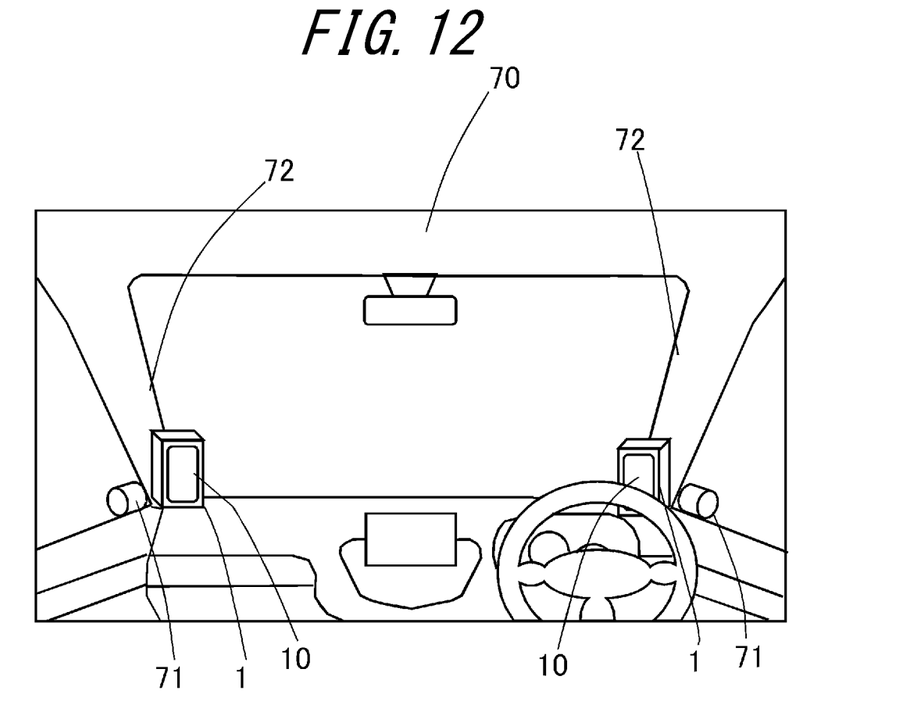
FIG. 12 is an explanatory diagram illustrating an example in which the display apparatus according to the another exemplary embodiment is installed in a vehicle cabin space.
Figure 13:
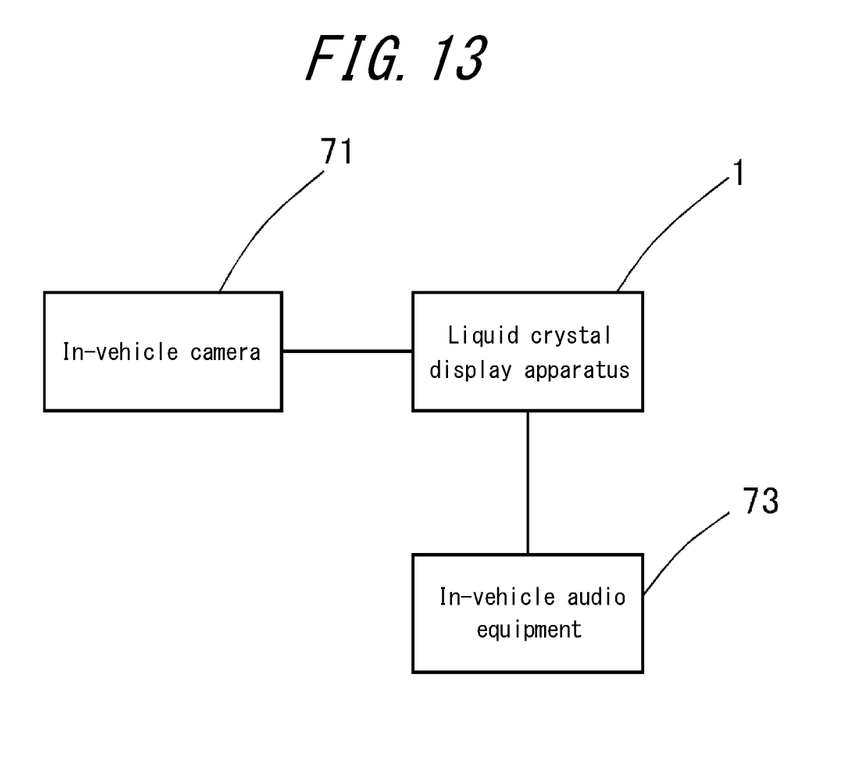
FIG. 13 is a block diagram illustrating a connection state of in-vehicle equipment.

FIG. 12 is an explanatory diagram illustrating an example in which the display apparatus according to another embodiment is installed in a vehicle cabin space 70. FIG. 13 is a block diagram illustrating a connection state of the in-vehicle equipment. The display apparatuses according to the another embodiment are installed in the vehicle cabin space 70 such as a passenger compartment of an automobile, and images around the automobile captured by in-vehicle cameras 71 provided in place of conventional side mirrors are displayed on the liquid crystal display apparatuses 1, which are the display apparatuses disposed in the vicinity of the pillars 72. Preferably, the sizes of the liquid crystal display apparatuses 1 are similar to or slightly larger than the widths of the pillars 72. When the liquid crystal display apparatuses 1 are disposed in the vicinity of the pillars 72, the driver's eyesight otherwise partially blocked can be cleared. Also, an in-vehicle audio equipment 73 is connected to the liquid crystal display apparatuses 1 and can generate a sound by vibrating the display substrates 10 of the liquid crystal display apparatuses 1. When the display substrates 10 have dual-functions of the display function for the in-vehicle camera 71 and the speaker function, the display substrates 10 can contribute to the effective use of the vehicle cabin space 70.

The display apparatus of the tactile sensation transmitting type according to the present disclosure can restrict displacement of the display substrate 10 transmitting vibration and reduce a force applied to the vibrator 56 caused by displacement or deformation of the display substrate 10 having the display surface 12c. Thus, the vibrator 56 is unlikely to be damaged, and a highly reliable display apparatus can be provided.

The display apparatus according to the present disclosure can restrict the displacement of the display substrate 10 generating sound and reduce a force applied to the vibrator 56 caused by displacement or deformation of the display substrate 10 having the display surface 12c. Thus, the vibrator 56 is unlikely to be damaged, and a highly reliable display apparatus can be provided.

The display apparatus according to the present disclosure can restrict the displacement of the display substrate 10 generating a sound and reduce a force applied to the vibrator 56 from the display substrate 10 due to acceleration or deceleration of a vehicle. Thus, the vibrator 56 is unlikely to be damaged, and a highly reliable display apparatus can be provided.

Although the present disclosure has been described in detail, the present disclosure should not be construed as being limited to the above embodiments, and various modifications and improvements can be made without departing from the scope of the present disclosure.

REFERENCE SIGNS LIST 1 liquid crystal display apparatus
10 display substrate
11 touch panel
12 transparent protective plate
12a operation surface
12b rear surface
12c display surface
13 contact detection unit
14 liquid crystal display panel
20 backlight
30 support
34a, 34b first displacement restriction portion
35a, 35b second displacement restriction portion
40 elastic support member
41 top surface 42a, 42b strip-like portion
43 fixing portion
44a, 44b spring portion
50 vibration member
51 vibrator support member
52 beam portion
53a, 53b leg portion
56 vibrator
57 protrusion
60 housing
70 vehicle cabin space
71 in-vehicle camera
72 pillar
73 audio equipment

The invention claimed is:

1. A tactile sensation transmitting type display apparatus comprising:
a display substrate having an operation surface;
a support disposed away from the display substrate on an opposite side from the operation surface of the display substrate;
a vibrator that is arranged between the display substrate and the support and configured to vibrate the display substrate; and
an elastic support member that extends from a display substrate side surface of the support to a surface of the support on an opposite side from the display substrate in a manner wrapping around the support, and has one edge fixed to the surface of the support on the opposite side from the display substrate and the other edge elastically supporting the display substrate,
wherein the support includes a displacement restriction portion being a portion facing the elastic support member in a direction perpendicular to the operation surface, which is configured to have a gap from a portion of the elastic support member in a state in which an external force is not applied to the display substrate, and to which the portion of the elastic support member abuts according to a displacement of the elastic support member with the external force.

2. The display apparatus according to claim 1, comprising:
a vibrator support member that includes a beam portion arranged on the opposite side from the operation surface and extends in a direction along the operation surface of the display substrate, and a leg portion that extends to the support from an edge of the beam portion and is fixed to the support,
wherein the vibrator is arranged on a surface of the beam portion on the opposite side from the display substrate.

3. The display apparatus according to claim 2,
wherein the beam portion is biased and abuts a surface of the display substrate on an opposite side from the operation surface.

4. The display apparatus according to claim 1,
wherein the elastic support member includes a spring portion on a side of the support on an opposite side from the display substrate.

5. The display apparatus according to claim 1,
wherein the display substrate is a liquid crystal display apparatus, and the support is fixed to a backlight.

6. The display apparatus according to claim 1,
wherein the display substrate is a liquid crystal display apparatus, and the support is a backlight.

7. A display apparatus comprising:
a display substrate having a display surface;
a support arranged spaced apart from the display substrate on an opposite side from the display surface of the display substrate;
a vibrator that is arranged between the display substrate and the support and configured to output a sound by vibrating the display substrate; and
an elastic support member that extends from a display substrate side surface of the support to a surface of the support on an opposite side from the display substrate in a manner wrapping around the support, and has one edge fixed to the surface of the support on the opposite side from the display substrate and the other edge elastically supporting the display substrate,
wherein the support includes a displacement restriction portion being a portion facing the elastic support member in a direction perpendicular to the display surface, which is configured to have a gap from a portion of the elastic support member in a state in which an external force is not applied to the display substrate, and to which the portion of the elastic support member abuts according to a displacement of the elastic support member with the external force.

8. A display apparatus comprising:
a display substrate having a display surface;
a support arranged spaced apart from the display substrate on an opposite side from the display surface of the display substrate;
a vibrator that is arranged between the display substrate and the support and configured to output a sound by vibrating the display substrate; and
an elastic support member extending so as to surround the support, and has one edge fixed to the surface of the support on the opposite side from the display substrate and the other edge elastically supporting the display substrate,
wherein the support constitutes a display apparatus that is installed in a vehicle cabin space and includes a displacement restriction portion being a portion facing the elastic support member in a direction perpendicular to the display surface, which is configured to have a gap from a portion of the elastic support member in a state in which an external force is not applied to the display substrate, and to which the portion of the elastic support member abuts according to a displacement of the elastic support member with the external force.

9. The display apparatus according to claim 7, comprising:
a vibrator support member that includes a beam portion arranged on an opposite side from the display surface of the display substrate and extends in a direction along the display surface of the display substrate and a leg portion that extends to the support from an edge of the beam portion and is fixed to the support,
wherein the vibrator is arranged on a surface of the beam portion on an opposite side from the display substrate.

10. The display apparatus according to claim 9,
wherein the beam portion is biased and abuts a surface on an opposite side from the display surface of the display substrate.

11. The display apparatus according to claim 7,
wherein the elastic support member includes a spring portion on a side of the support on an opposite side from the display substrate.

12. The display apparatus according to claim 7,
wherein the display substrate constitutes a liquid crystal display apparatus, and the support is fixed to a backlight.

13. The display apparatus according to claim 7,
wherein the display substrate constitutes a liquid crystal display apparatus, and the support constitutes a backlight.

* * * * *